Patented June 3, 1952

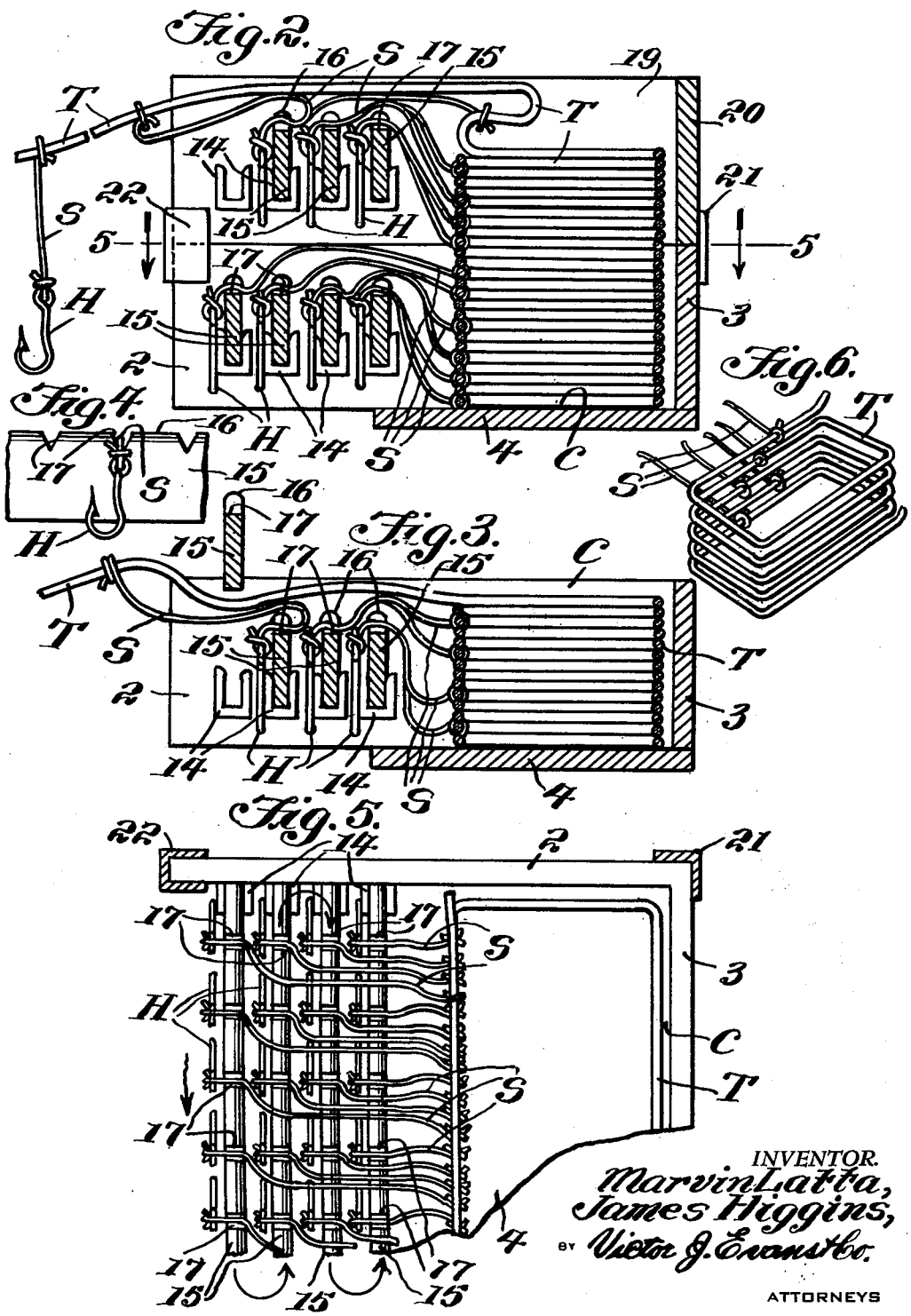

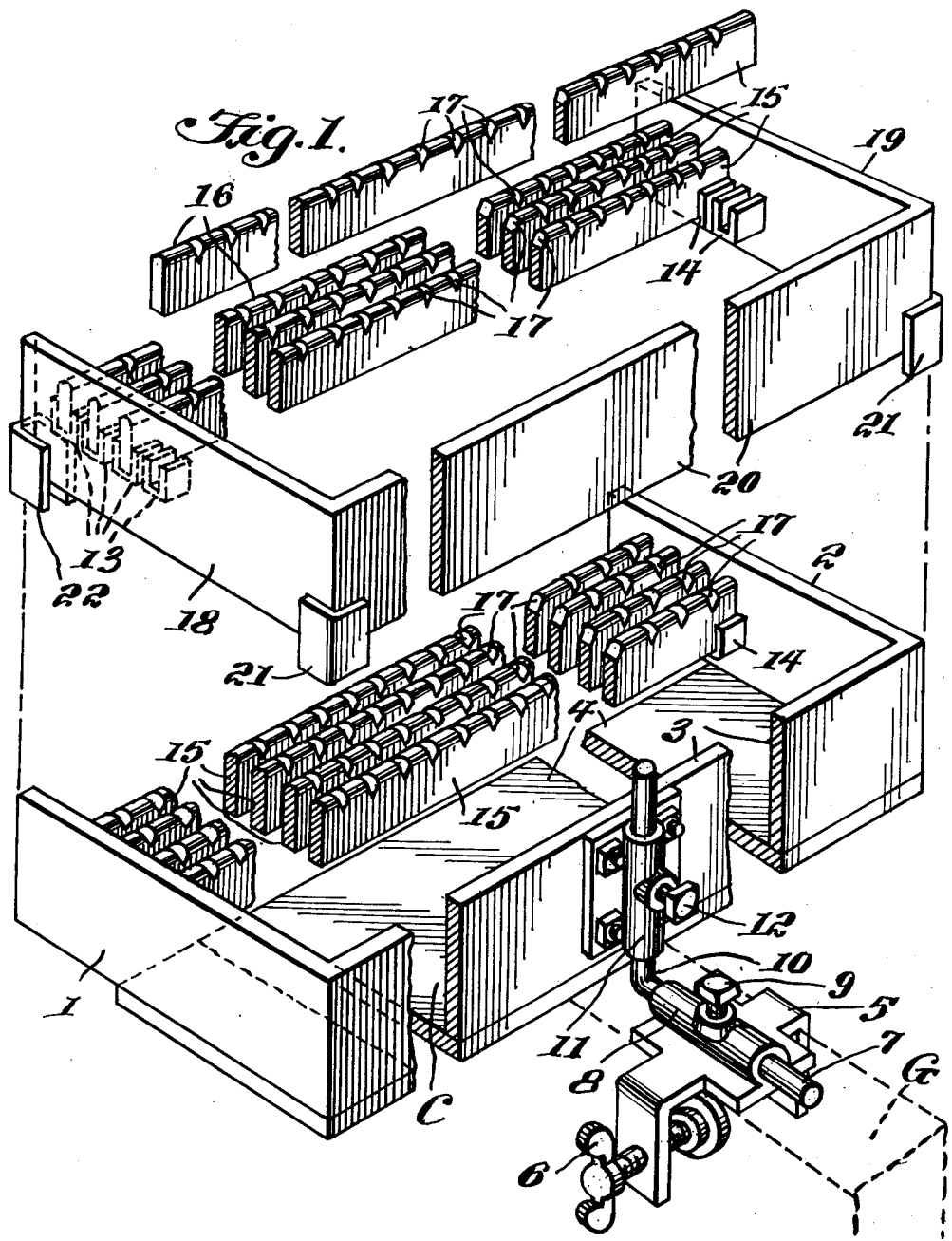

2,599,113

UNITED STATES PATENT OFFICE 2,599,113

AUTOMATIC TROT LINE SETTER

Marvin Latta and James Higgins,
Mount Vernon, Ill.

Application April 5, 1949, Serial No. 85,512

1 Claim. (Cl. 43—54.5)

Our present invention relates to holders for fishing lines, hooks and tackle, and more specifically to an automatic trotline setter adapted, as a portable appliance, for attachment to the gunwale of a boat for use in trotline fishing, and also adapted for attachment to a support for storage, and for drying and servicing the lines and tackle. The invention as illustrated may be embodied in separable units or sections for use by commercial fishermen in setting miles of ready baited continuous trotlines; and the separated units are adapted for smaller scale fishing operations, from which the lines may be paid out with speed and convenience without danger of entangling the lines and tackle.

The sections or units are each equipped with interchangeable and removable racks and rack bars for supporting the line and tackle in predetermined arrangement, and the rack bars may be dispensed with, successively, as the line is being set, to facilitate the setting operation and accurately set the lines.

The attachment in which the invention is embodied includes a minimum number of parts that may with facility be manufactured at low cost of production, and the parts may be assembled with convenience, and dismounted with ease, to assure a setting device that is simple in construction and operation, and which may be manipulated for speedy fishing operations.

The invention consists in certain novel features of construction and combinations and arrangements of parts as will hereinafter be described and more particularly set forth in the appended claim.

In the accompanying drawings we have illustrated a complete example of a physical embodiment of our invention in which the parts are combined and arranged in accord with one mode we have devised for the practical application of the principles of the invention. It will however be understood that changes and alterations may be made in these exemplifying drawings and mechanical structures, within the scope of our claim without departing from the principles of the invention.

Figure 1 is an exploded, broken away, perspective view, of a trotline setter in which our invention is embodied, and mounted by a swiveled clamp bracket on the gunwale of a boat or other support.

Figure 2 is a vertical sectional view of a two-unit or two-section setter, showing the manner of feeding out or setting the trotline from a coil in the setter.

Figure 3 is a view similar to Fig. 2 showing a single unit setter.

Figure 4 is a detail view showing the manner of supporting a hook and tackle on one of the rack bars.

Figure 5 is a horizontal plan view of a portion of the base section or unit, as at line 5—5 of Fig. 2; and Figure 6 illustrates the manner of coiling the trotline within the setter.

In order that the general arrangement and utility of parts may readily be understood we have indicated in Fig. 1 the gunwale G of a boat, upon which the setter is swiveled and the trotline T with its tackle including branch lines or staging lines S and hooks H, is coiled in a compartment C of the base unit or bottom section of the setter.

In actual practice two or more sections may be employed for commercial fishing, and for smaller scale fishing operations the base unit or bottom section may be used singly. The sections or units are manufactured of suitable materials and in desirable sizes for interchangeable use, and the separable racks or boxes are also made up of interchangeable and removable parts.

The base unit or bottom section consists of a rack or open boxlike structure having two opposed end walls 1 and 2 and a back wall 3, together with a narrow bottom 4 that forms the compartment or receptacle C in which the line is coiled and from which the line is fed out or set. The setter may be attached to the gunwale G of a boat as indicated in Fig. 1 by means of a swivel bracket having a clamp base 5 that is clamped by screw 6 to the gunwale, and one arm 7, of an angular swivel pin is journaled in a bearing 8 of the clamp and fixed in adjusted position by set screw 9.

The upright arm 10 of the angular swivel pin is journaled in a bearing 11 attached to the back wall 3 of the box or rack, and set screw 12 is employed for fixing the bracket in adjusted position. By means of the double acting swivel bracket the attachment may be swung outboard or inboard for various steps in the fishing operations.

Each end wall 1, 2, of the box or rack, on its inner side is equipped with pairs of rigidly mounted U-shaped stirrup brackets or hangers as 13 and 14, and the complementary hangers of an alined pair are adapted to receive and support the ends of an interchangeable and removable rack bar 15 that is preferably flat, and rectangular in cross section, and the rounded top edge 16 of each rack bar is fashioned with a series of spaced V-shaped notches or kerfs 17 adapted to guide the branch hook-lines of the trot-line.

With the trotline coiled in the compartment C, the hook and tackle or the branch lines S and hooks H are suspended in the notches of the successively arranged rack bars, and as the trotline is paid out or set the tackle is successively dispensed from the outermost rack bar as the staging lines S are successively lifted from their notches or kerfs. Beginning with the outermost rack bar, as in Fig. 3, when this bar is emptied of its tackle, the empty bar is lifted from its stirrup brackets or hangers to provide free movement for the tackle being dispensed from the next rack bar, and as the trotline is fed from the setter the rack bars are successively removed. For stowing the trotline and tackle this feeding operation of the line is reversed, and the innermost rack bar is first placed in its brackets to receive and support the tackle, then succeeding rack bars are placed in their brackets and the succeeding tackle supported thereon, until the necessary number of rack bars have been installed to accommodate the hook and tackle of the trotline.

To set a longer line, a second section or rack is first mounted upon the base unit, and as the trotline is set the tackle is first dispensed from the outermost rack bar of the upper section; then the succeeding rack bars of the upper section are successively removed as the tackle is dispensed therefrom. When the upper section has been emptied, it is removed from the base section, and then the setting of the line is continued by dispensing the tackle from the outermost rack bar of the base unit, as previously described.

The upper section or rack includes two opposed end walls 18 and 19 each of which is equipped with pairs of stirrups or brackets 14 to receive and support the rack bars 15 in series, and these end walls are united by a back wall 20 to form a rack that is open at its top, at its bottom, and open at its front, to permit freedom of movement of the trotline and tackle.

One or more of these open racks may successively be mounted upon the base section, and removably held in place by means of two centering corner clips 21 of right-angular shape that are fastened to the rear corners of the rack and adapted to fit over the complementary corners of the base unit; and in addition the front edges of the two end walls 18 and 19 are each equipped with a centering clip as 22, of U-shape that is adapted to fit over the upper corner at the front edges of the side walls 1 and 2 of the base unit. By this means the upper rack may readily be set in position, when required, on the base rack, and with equal facility the upper rack may be detached and removed after serving its purpose.

Having thus fully described our invention, what we claim as new and desire to secure by Letters Patent is:

In a sectional trotline setter having an upper section and a lower section and the lower section forming a receptacle for a coiled trotline, and a pair of opposed end walls for each section, the combination with means for detachably mounting the upper section on the lower section, of a series of stirrup brackets mounted on adjoining faces of the opposed walls, and a series of removable and interchangeable rack bars each rack bar being adapted to be mounted in a pair of said stirrup brackets in each section, said rack bars being provided with supporting and guiding means for the branch hook-lines of the trotline.

MARVIN LATTA.
JAMES HIGGINS.

REFERENCES CITED

The following references are of record in the file of this patent:

UNITED STATES PATENTS

| Number | Name | Date |
| --- | --- | --- |
| 115,175 | Davis | May 23, 1871 |
| 898,138 | Roberts | Sept. 8, 1908 |
| 1,221,904 | Potier | Apr. 10, 1917 |
| 1,523,136 | O'Connor | Jan. 13, 1925 |
| 1,815,568 | Jacqmien | July 21, 1931 |
| 2,100,763 | Kersenbrock | Nov. 30, 1937 |
| 2,144,804 | Irwin et al. | Jan. 24, 1939 |
| 2,220,817 | Holmes | Nov. 5, 1940 |
| 2,272,569 | Luhman | Feb. 10, 1942 |

FOREIGN PATENTS

| Number | Country | Date |
| --- | --- | --- |
| 40,147 | Norway | Dec. 7, 1923 |
| 57,415 | Sweden | Oct. 10, 1922 |